United States Patent
Shin et al.

(10) Patent No.: US 8,943,503 B2
(45) Date of Patent: Jan. 27, 2015

(54) APPARATUS AND METHOD FOR THREAD PROGRESS TRACKING USING DETERMINISTIC PROGRESS INDEX

(75) Inventors: Young Sam Shin, Hwaseong-si (KR); Seung Won Lee, Hwaseong-si (KR); Shi Hwa Lee, Seoul (KR); Suk Jin Kim, Seoul (KR); Min Young Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 13/156,492

(22) Filed: Jun. 9, 2011

(65) Prior Publication Data

US 2012/0005679 A1 Jan. 5, 2012

(30) Foreign Application Priority Data

Jul. 2, 2010 (KR) ........................ 10-2010-0063744

(51) Int. Cl.
*G06F 9/46* (2006.01)
*G06F 11/34* (2006.01)

(52) U.S. Cl.
CPC ................... *G06F 11/3466* (2013.01)
USPC ........................................ 718/100; 718/107

(58) Field of Classification Search
None
See application file for complete search history.

(56) References Cited

U.S. PATENT DOCUMENTS

| 5,835,705 A | 11/1998 | Larsen et al. |
| 6,625,635 B1 | 9/2003 | Elnozahy |
| 7,617,385 B2 | 11/2009 | Indukuru et al. |
| 2003/0233394 A1* | 12/2003 | Rudd et al. ..................... 709/107 |
| 2008/0104610 A1* | 5/2008 | Norton et al. ................. 718/108 |
| 2008/0201566 A1 | 8/2008 | Indukuru et al. |
| 2009/0119549 A1 | 5/2009 | Vertes |

FOREIGN PATENT DOCUMENTS

| JP | 05-346870 | 12/1993 |
| JP | 10-254739 | 9/1998 |
| JP | 2004-078338 | 3/2004 |
| KR | 10-0279810 | 11/2000 |
| KR | 10-0384263 | 5/2003 |
| KR | 10-2008-0052343 | 6/2008 |
| KR | 10-2009-0017586 | 2/2009 |

\* cited by examiner

*Primary Examiner* — Kenneth Tang
(74) *Attorney, Agent, or Firm* — NSIP Law

(57) ABSTRACT

Provided is a method and apparatus for measuring a performance or a progress state of an application program to perform data processing and execute particular functions in a computing environment using a micro architecture. A thread progress tracking apparatus may include a selector to select at least one thread constituting an application program; a determination unit to determine, based on a predetermined criterion, whether an instruction execution scheme corresponds to a deterministic execution scheme having a regular cycle or a nondeterministic execution scheme having an irregular delay cycle with respect to each of at least one instruction constituting a corresponding thread; and a deterministic progress counter to generate a deterministic progress index with respect to an instruction that is executed by the deterministic execution scheme, excluding an instruction that is executed by the nondeterministic execution scheme.

18 Claims, 10 Drawing Sheets

APPARATUS AND METHOD FOR THREAD PROGRESS TRACKING USING DETERMINISTIC PROGRESS INDEX

CROSS-REFERENCE TO RELATED APPLICATIONS

This application claims the priority benefit of Korean Patent Application No. 10-2010-0063744, filed on Jul. 2, 2010, in the Korean Intellectual Property Office, the disclosure of which is incorporated herein by reference.

BACKGROUND

1. Field

Example embodiments relate to a method and apparatus for measuring a performance or a progress state of an application program to perform data processing and execute particular functions in a computing environment using a micro architecture.

2. Description of the Related Art

As a distribution of portable devices and an information processing amount increases, computing devices become complex and a variety of applications need to be simultaneously performed. In addition, according to an increase in applications, such as a multimedia application using real-time processing, there has been an increasing interest in a system performance of the computing devices. An application may not be effectively processed using a single processor alone.

To overcome the above circumstance, semiconductor integrated technology has been developed and multi-processor computing technology has been introduced. Compared to a single processor, a multi-processor may have a relatively great energy efficiency and performance enhancement. However, the design and development of a system using the multi-processor may not be readily performed. In addition, it may be difficult to verify a system having simultaneity. A verification cost of the system having the simultaneity may increase in proportion to a square of a number of cores with respect to a development period of an existing sequential system. A variety of schemes have been proposed to reduce the verification cost. A basic function to effectively configure the variety of schemes may accurately measure the performance and progress state of the application program executing the variety of instructions.

SUMMARY

The foregoing and/or other aspects are achieved by providing an apparatus for thread progress tracking, including: a selector to select at least one thread constituting an application program; a determination unit to determine, based on a predetermined criterion, whether an instruction execution scheme corresponds to a deterministic execution scheme having a regular cycle or a nondeterministic execution scheme having an irregular delay cycle with respect to each of at least one instruction constituting a corresponding thread; and a deterministic progress counter to generate a deterministic progress index with respect to an instruction that is executed by the deterministic execution scheme, excluding an instruction that is executed by the nondeterministic execution scheme.

The nondeterministic execution scheme may include a hardware nondeterministic execution (HWND) to execute the instruction using the nondeterministic execution scheme at an instruction level of a hardware based processor, and a software nondeterministic execution (SWND) to execute a function using the nondeterministic execution scheme at a function level, the function including software based instructions.

When the instruction execution scheme is determined as the deterministic execution scheme, the deterministic progress counter may increase the deterministic progress index based on a system clock.

An operation of the deterministic progress counter may be controlled based on an HWND signal to execute the instruction using the nondeterministic execution scheme at an instruction level of a hardware based processor, or an SWND signal to execute a function using the nondeterministic execution scheme at a function level, the function including software based instructions.

The HWND signal may be generated based on a stall signal occurring at a processor.

When a user function is executed, the SWND signal may be generated using a separate code.

The deterministic progress counter may include a control unit to control an SWND signal executing a function using the nondeterministic execution scheme at a function level, so that the deterministic progress counter may not operate when the corresponding thread is not in a running state, and the function includes software based instructions.

When an interrupt occurs in the running state of the thread, the control unit may set the SWND signal to suspend the deterministic progress counter. When the thread becomes in the running state after an interrupt service routine is performed, the control unit may clear the SWND signal to operate the deterministic progress counter.

The deterministic progress counter may be positioned based on a processor unit.

The apparatus may further include: a memory to store a deterministic progress index corresponding to each of the at least one thread for each thread; and a copy unit to copy a current deterministic progress counter value to the memory when the corresponding thread is in a running state.

The copy unit may copy, to the memory as the deterministic progress index, a deterministic progress counter value at a point in time when the corresponding thread is context switched to another thread. The apparatus may further include a loading unit to load the copied deterministic progress index to the deterministic progress counter when a context switch is performed from the other thread to a previous thread before the context switch.

The determination unit may include a set determination unit to determine whether a flag value is set in a thread control block of the corresponding thread on a scheduler, the flag value indicating that the nondeterministic function is being executed.

The set determination unit may set an SWND signal to suspend the deterministic progress counter when the flag value is set. The set determination unit may correct an increase of the deterministic progress counter that is unused to execute an instruction of an actual thread when the flag value is not set.

The foregoing and/or other aspects are achieved by providing a method for thread progress tracking, including: selecting at least one thread constituting an application program; determining, based on a predetermined criterion, whether an instruction execution scheme corresponds to a deterministic execution scheme having a regular cycle or a nondeterministic execution scheme having an irregular delay cycle with respect to at each of least one instruction constituting the corresponding thread; and generating a deterministic progress index based on a deterministic progress counter, with respect to an instruction that is executed by the deterministic execution scheme, excluding an instruction that is executed by the nondeterministic execution scheme.

An operation of the deterministic progress counter may be controlled based on an HWND signal to execute the instruction using the nondeterministic execution scheme at an instruction level of a hardware based processor, or an SWND signal to execute a function using the nondeterministic execution scheme at a function level, the function including software based instructions.

The method may further include: storing, in a memory, a deterministic progress index corresponding to each of the at least one thread for each thread; and copying a current deterministic progress counter value to the memory when the corresponding thread is in a running state.

The copying may include copying, to the memory as the deterministic progress index, a deterministic progress counter value at a point in time when the corresponding thread is context switched to another thread. The method may further include loading the copied deterministic progress index to the deterministic progress counter when a context switch is performed from the other thread to a previous thread before the context switch.

The foregoing and/or other aspects are achieved by providing a method for thread progress tracking, including: selecting a thread based on an instruction to be executed on a scheduler; setting a deterministic progress index stored in the thread as an initial value of a deterministic progress counter; determining whether a flag value is set in a thread control block of the thread, the flag value indicating that a nondeterministic function is being executed; setting a software nondeterministic execution (SWND) signal to suspend the deterministic progress counter when the flag value is set; and correcting an increase of the deterministic progress counter that is unused to execute an instruction of an actual thread when the flag value is not set, and clearing the SWND signal to operate the suspended deterministic progress counter.

The foregoing and/or other aspects are achieved by providing a method for thread progress tracking, including: dispatching a thread to be in a running state; setting a software nondeterministic execution (SWND) signal to suspend a deterministic progress counter when a scheduler event occurs in the thread that is in the running state; storing a value of the suspended progress counter as a deterministic progress index value when a context switch event occurs in a state where the deterministic progress counter is suspended; and correcting an increase of the deterministic progress counter that is unused to execute an instruction of an actual thread when the scheduler event is terminated in a state where the deterministic progress counter is suspended, and clearing the SWND signal to operate the suspended deterministic progress counter.

The method may further include: setting the SWND signal to suspend the deterministic progress counter when the flag value is set; executing a nondeterministic function; and clearing the set flag value when the execution of the nondeterministic function is completed, and correcting an increase of the deterministic progress counter that is unused to execute an instruction of an actual thread and then clearing the SWND signal to operate the suspended deterministic progress counter. The determining may include determining whether a flag value is set in a thread control block of the thread, the flag set indicating that the nondeterministic function is being executed.

According to example embodiments, since a progress state of a thread constituting an application is predictable using a thread progress tracking apparatus, thread and system resources may be effectively managed.

A deterministic progress counter may perform a simple calculation and thus, a performance deterioration occurring due to a management may barely occur in the deterministic progress counter. The deterministic progress counter may be configured at relatively low costs by adding, to an existing counter, only an operation/suspension function using an SWND signal and an HWND signal.

According to example embodiments, there is provided a thread progress tracking apparatus that may perform an accurate thread management in multi-threading by providing an accurate thread progress index of a processor cycle level.

According to example embodiments, there is provided a thread progress tracking apparatus that may provide a deterministic execution environment of programs to be parallel processed in a multi-processor state, with relatively low runtime overhead.

According to example embodiments, there is provided a thread progress tracking apparatus that may provide a predictable system control function by providing an accurate thread progress index, and may effectively perform a load distribution and a low power management.

According to example embodiments, there is provided a thread progress tracking apparatus that may accurately predict a progress state of a thread using a deterministic progress index and thus, may effectively verify a system having simultaneity.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
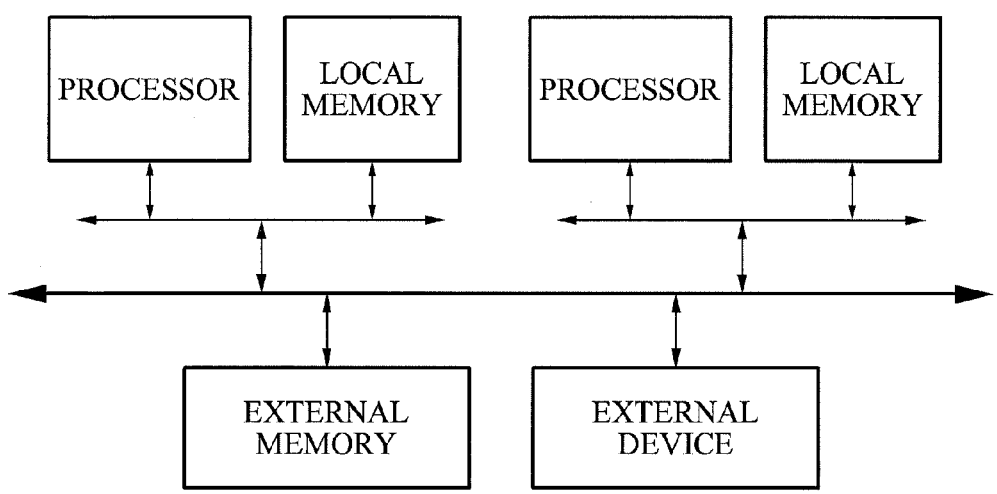
FIG. 1 illustrates a computing environment where a general application program is executed.

Reference will now be made in detail to embodiments, examples of which are illustrated in the accompanying drawings, wherein like reference numerals refer to the like elements throughout. Embodiments are described below to explain the present disclosure by referring to the figures.

When an accurate performance and progress of an application program being executed is measurable, a measured value may be used for a performance enhancement of a thread, load balancing, and low power management by indexing the measured value. However, it may be difficult to accurately measure a state of the application program while maintaining a runtime performance. In addition, instructions used for an execution of the application program may be inconsistently executed. Due to unexpected effect from other application programs executed together with the application program, it may be difficult to accurately measure the state of the application program. Even though a single application program is executed, a plurality of threads constituting the single application program may be simultaneously executed, which may cause the effect. Even though the application program consists of a single thread, instructions constituting the thread may be executed at different time intervals, which makes it difficult to make an accurate measurement.

A conventional method of measuring a progress state of an application program may include a method of inserting an additional code and a method of using a performance counter. The method of inserting the additional code may be easily configured. However, due to runtime overhead from the insertion, it may be impossible to accurately measure the progress state of the application program. The method of using the performance counter may be configured at relatively low costs. However, since a retired instruction event is used, a clock rate difference may occur between threads. To measure a highly accurate index by increasing a virtual clock rate, interrupt overhead of the performance counter may occur, deteriorating a performance of the application program. Accordingly, there is a desire for a progress state measurement method that may deterministically measure a progress of an application program, reflect an accurate actual thread progress, and be configured with relatively small runtime overhead and low costs.

FIG. 1 illustrates a computing environment where a general application program is executed.

The general application program may perform a predetermined function by employing, as resources, a memory and a hardware device in a processor. In general, the memory has a hierarchical structure. In this instance, when an access speed of the memory is relatively fast, the memory may be provided to a local bus. When the access speed of the memory is relatively slow, however, is inexpensive, the memory may be provided to a system bus. To satisfy a high performance requirement, a multi-processor may perform parallel processing of the application program by integrating processors in a single system.

The general application program may include at least one thread. Accordingly, multiple threads may be executed in a single processor. That the multiple threads are executed in the single processor is referred to as multi-threading. Accordingly, to measure a performance and a progress state of the application program, a performance and a progress state of the at least one thread constituting the application program may need to be measured. FIG. 1 illustrates an example of the general computing environment and thus, an application environment of a thread progress tracking apparatus is not limited thereto.

Figure 2:
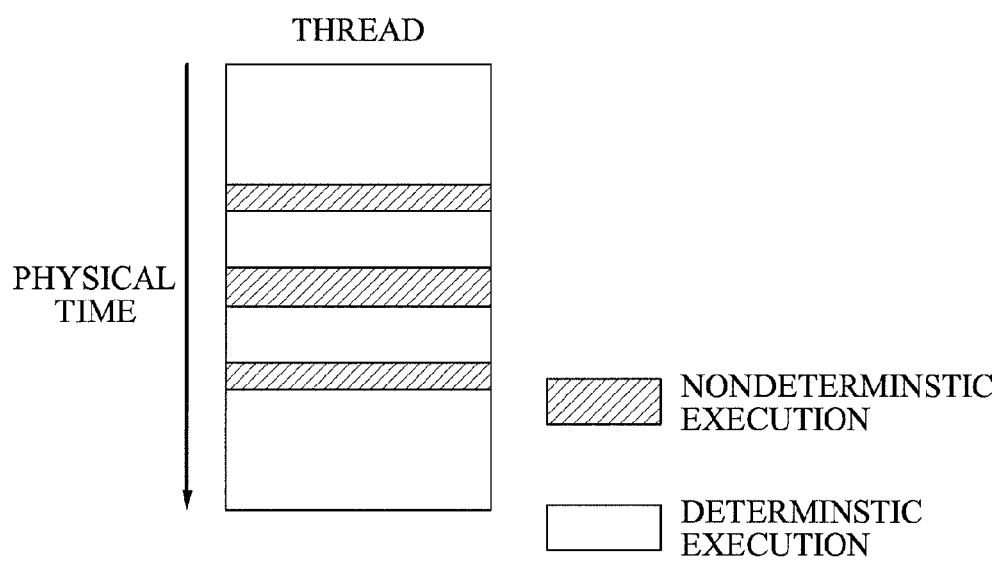
FIG. 2 illustrates an example of an instruction to execute a function of an application program based on a deterministic execution scheme and a nondeterministic execution scheme according to example embodiments.

FIG. 2 illustrates an example of an instruction to execute a function of an application program based on a deterministic execution scheme and a nondeterministic execution scheme according to example embodiments.

The application program may include a plurality of threads. Each of the threads may include instructions to execute a particular function. An instruction execution scheme may be classified into a deterministic execution scheme and a nondeterministic execution scheme. When the instruction execution scheme corresponds to the deterministic execution scheme, a point in time when an execution of a corresponding instruction is completed or a point in time when an execution of an instruction group is completed may have a regular cycle. When the instruction execution scheme corresponds to the nondeterministic execution scheme, the point in time when the execution of the instruction is completed or the point in time when the execution of the instruction group is completed may have an irregular cycle.

Referring to FIG. 2, a physical time where each of the threads is executed may consistently increase. In the case of a deterministic execution area, instructions may be completed within the same execution time at all times. Conversely, in the case of a nondeterministic execution area, a completion time may be inconsistent due to the effect from execution of other threads or due to a different circumstance occurring based on an executed point in time. Nondeterministic execution may be classified into hardware nondeterministic execution (HWND) to perform nondeterministic execution at an instruction level of a processor, and software nondeterministic execution (SWND) to perform the nondeterministic execution at a level of an inconsistently occurring event in an aspect of a function including instructions or software.

In a remaining portion excluding the SWND and the HWND in execution of an actual thread, an instruction execution time can be consistent. Since a cycle used to execute the remaining portion excluding the SWND and the HWND has the same value at all times, an index obtained by indexing the remaining portion may be used for a deterministic execution index of a corresponding thread. For example, an index for a deterministic execution time indicates the same position at all times in thread execution. The index indicating the deterministic execution time is referred to as a deterministic progress index (DPI). The DPI may be expressed by, $$P_{Thread} = P_{DeterministicExecution} + P_{NondeterministicExecution}$$

$$T_{DTP} = T_{RunningState} - (T_{SWND} + T_{HWND})$$

Here, $P_{Thread}$ constituting the application program may be classified into deterministic execution $P_{DeterministicExecution}$ and nondeterministic execution $P_{NondeterministicExecution}$. Accordingly, the time $T_{DTP}$ indicating the deterministic progress of the thread may be obtained by subtracting SWND execution time $T_{SWND}$ and HWND execution time $T_{HWND}$ from time $T_{RunningState}$ where the thread is in a running state. Here, the case where the thread is in the running state may include a case where a requested instruction is executed.

Figure 3:
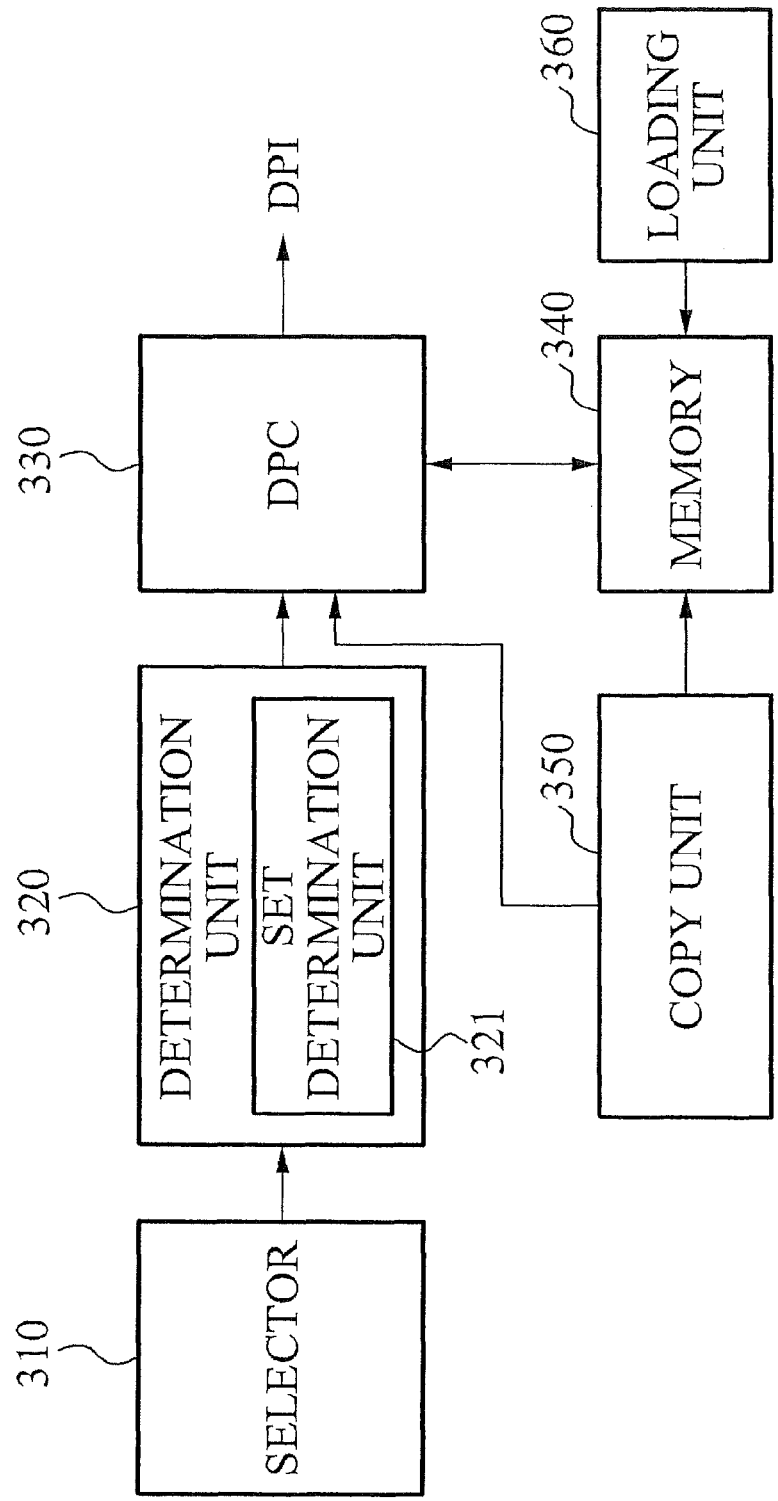
FIG. 3 illustrates a thread progress tracking apparatus according to example embodiments.

FIG. 3 illustrates a thread progress tracking apparatus according to example embodiments.

Referring to FIG. 3, the thread progress tracking apparatus may include a selector 310, a determination unit 320, and a deterministic progress counter (DPC) 330.

The selector 310 may select at least one thread constituting an application program. The selector 310 may select, from the at least one thread constituting the application program, a thread capable of performing a function requested by a user.

The determination unit 320 may determine, based on a predetermined criterion, whether an instruction execution scheme corresponds to a deterministic execution scheme having a regular cycle or a nondeterministic execution scheme having an irregular delay cycle with respect to each of instructions constituting a corresponding thread. Here, the determination may be made based on a predetermined criterion. The predetermined criterion may be defined based on whether an instruction execution time has a regular cycle. Accordingly, whether the instruction execution scheme corresponds to the deterministic execution scheme or the nondeterministic execution scheme may be determined based on the predetermined criterion, which will be further described with reference to FIG. 4. The predetermined criterion may be defined based on HWND and SWND.

The determination unit 320 may include a set determination unit 321 to determine whether a flag value is set in a thread control block of the thread on a scheduler (not shown). The flag value may indicate that a nondeterministic (ND) function is being executed. The set determination unit 321 may determine whether the ND function is being executed based on the flag value. The set determination unit 321 may set an SWND signal to suspend the DPC 330 when the flag value is set, and may correct an increase of the DPC 330 that is unused to execute an instruction of an actual thread when the flag value is not set.

The DPC 330 may generate a DPI with respect to an instruction that is executed by the deterministic execution scheme, excluding an instruction that is executed by the non-deterministic execution scheme. Specifically, the DPC 330 may generate the DPI by increasing a count only when the instruction to be executed in the thread is executed using the deterministic execution scheme.

Also, an HWND signal may be generated based on a stall signal generated at a processor (not shown). When a user function is executed as the ND function, the SWND signal may be generated using a separate code, for example, an application programming interface (API). It will be further described with reference to FIG. 9 and FIG. 10.

The thread progress tracking apparatus may further include a memory 340 to store a DPI corresponding to each of the at least one thread for each thread. For example, the thread progress tracking apparatus may include the memory 340 that may store a DPI of each thread. The thread progress tracking apparatus may further include a copy unit 350 to copy a current DPI value to the memory 340 when the thread is in the running state.

The copy unit 350 may copy, to the memory 340 as the DPI, a DPC value at a point in time when the thread is context switched to another thread, and The thread progress tracking apparatus may further include a loading unit 360 to load the copied DPI to the DPC 330 when a context switch is performed from the other thread to a previous thread before the context switch.

Figure 4:
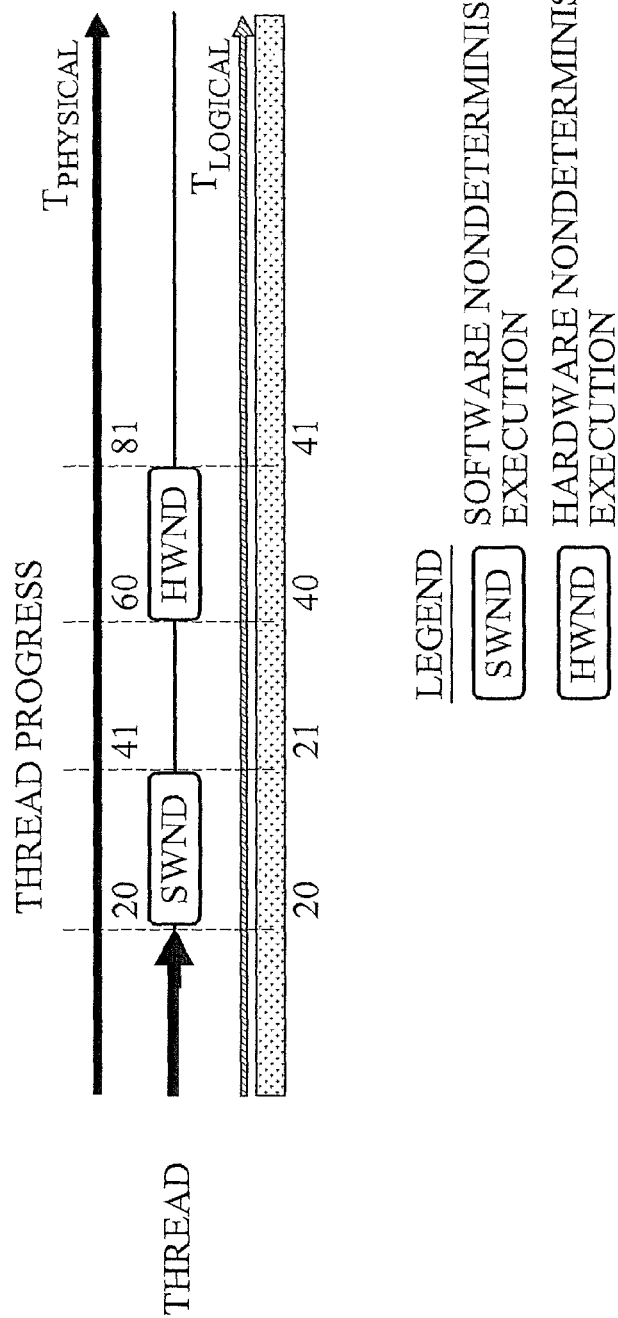
FIG. 4 illustrates an example of a progress index according to example embodiments.

FIG. 4 illustrates an example of a DPI excluding HWND and SWND in a thread progress according to example embodiments.

FIG. 4 illustrates a DPI concept of indexing a logical time excluding SWND and HWND in an actual thread. While SWND and HWND are executed, a physical time may increase, whereas the DPI may not increase. Accordingly, a DPI value may be used as a deterministic index indicating a thread execution. In the thread execution, SWND and HWND may be determined based on a predetermined criterion. The predetermined criterion may be defined based on a case where an execution time of an instruction or an execution time of a function including instructions measured by a current point in time is consistent, and a case where the execution time is inconsistent. The predetermined criterion is only an example of SWND and HWND. However, it is not limited thereto. Examples of SWND and HWND are shown in Table 1:

TABLE 1

| | Type | Example |
|---|---|---|
| SWND | Schedule time | All the states excluding running state. Event or timer wait (EventWait( ), sleep( ), . . . ) |
| | Interrupt management | Interrupt management instruction Interrupt service routine |
| | Dynamic resource assignment | Memory assignment/non-assignment Thread generation/termination |
| | Nondeterministic user function | Busy waiting |
| | Nondeterministic external device access | Blocked access for nondeterministic hardware device |
| | Others | |
| HWND | External memory access | DRAM access |
| | Cache miss | Instruction/data cache miss |
| | Branch | Dynamic branch prediction |
| | Others | |

Even though not shown in the examples of Table 1, SWND and HWND may include all the execution sections that are nondeterministic in performing a thread function.

Figure 5:
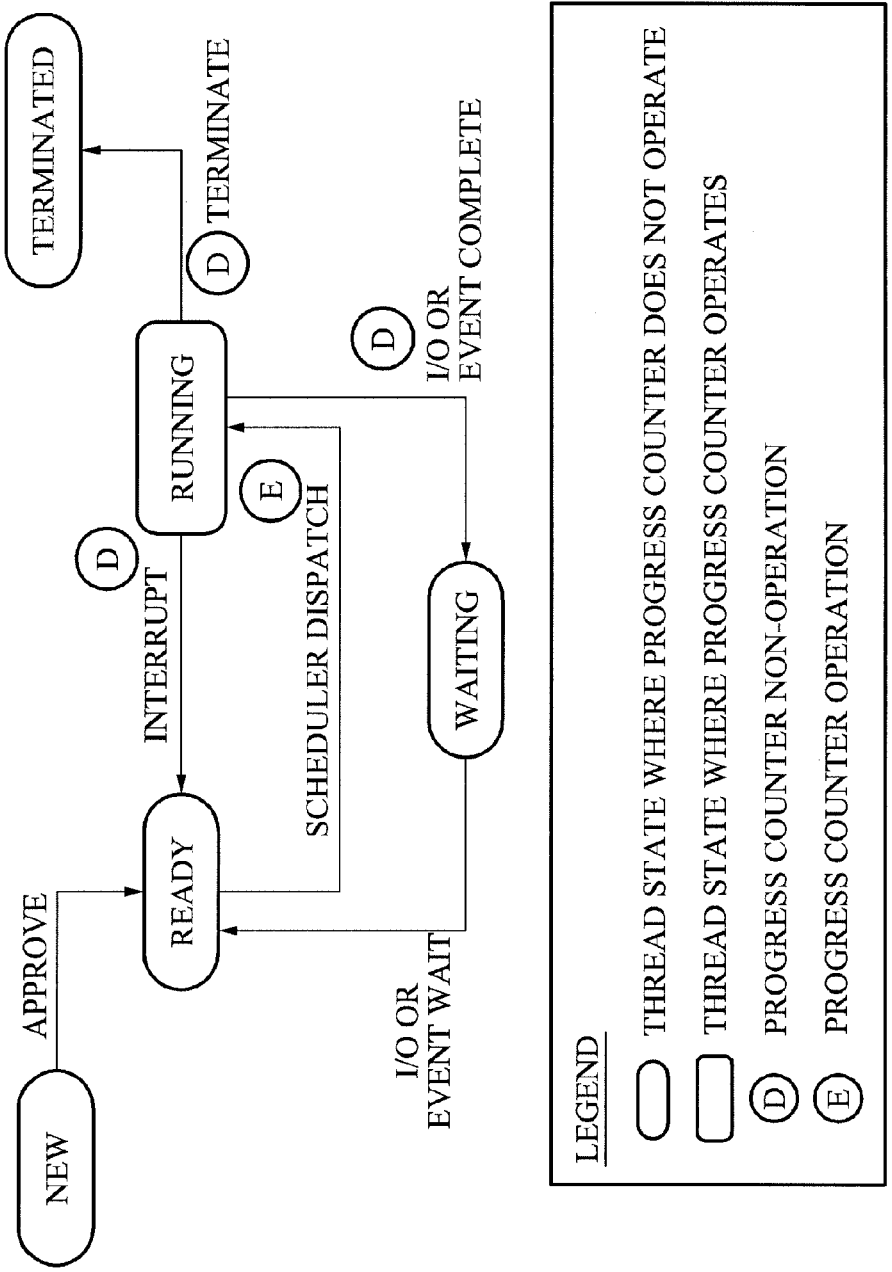
FIG. 5 illustrates an operation of a progress counter based on a change in a state of a thread according to example embodiments.

FIG. 5 illustrates an operation of a progress counter based on a change in a state of a thread according to example embodiments.

An operating system (OS) may perform management and scheduling so that system resources may be effectively used through a plurality of threads constituting an application program. When a thread is scheduled by the OS, a state shift may be performed as shown in FIG. 5. Only when the thread is in a running state, a substantial thread execution may be performed. Accordingly, when the thread is not in the running state, the thread progress tracking apparatus may control an SWND signal so that a DPC may not operate.

For example, when interrupt occurs while the thread is running, the thread progress tracking apparatus may set the SWND signal so that the DPC may not operate. When the thread becomes again in the running state through a scheduler dispatch after an interrupt service routine is performed, the thread progress tracking apparatus may clear the SWND signal to operate the DPC. Specifically, the thread progress tracking apparatus may increase a DPI value of a corresponding thread only in the case of deterministic execution.

Figure 6:
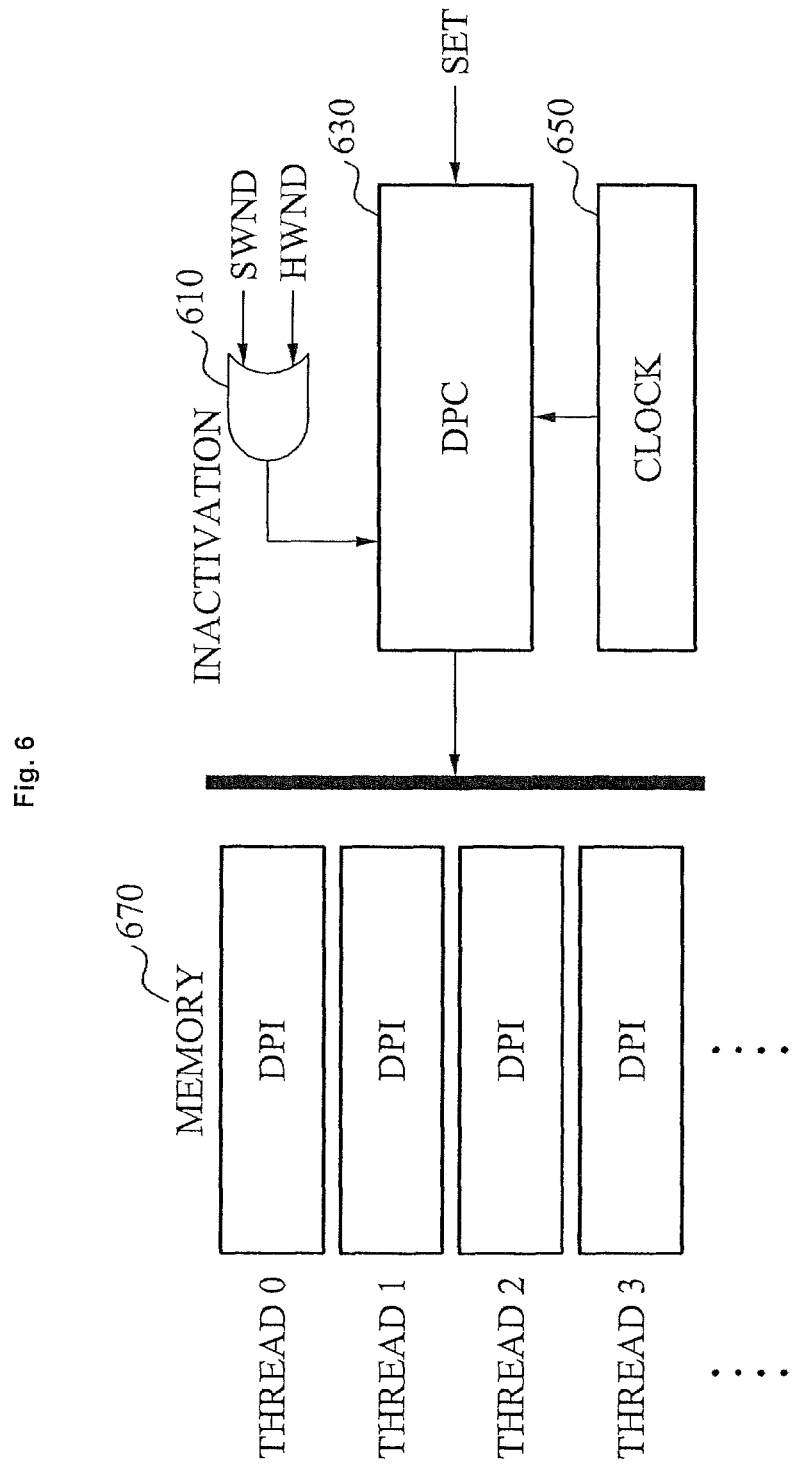
FIG. 6 illustrates an example of a relationship between a deterministic progress counter (DPC) and a deterministic progress index (DPI) for each thread according to example embodiments.

FIG. 6 illustrates an example of a relationship between a DPC and a DPI for each thread according to example embodiments.

Referring to FIG. 6, the DPC 630 may be positioned for each processor, and an activation of the DPC 630 may be determined based on an SWND signal and an HWND signal. An OR logical circuit 610 of FIG. 6 is configured so that the DPC 630 is inactivated when the SWND signal or the HWND signal is set. An activation issue of the DPC indicates an operation of the DPC 630 and a non-operation of the DPC 630. In addition to a scheme of controlling the DPC using the SWND signal and the HWND signal, the DPC 630 may be controlled using a variety of schemes.

The thread progress tracking apparatus may have a DPI memory 670 to store a DPI of each thread for each thread, and may copy a current DPC value to a DPI memory 670 of a corresponding thread that is in the running state. The thread progress tracking apparatus may copy, as the DPI, a value counted through the DPC. The thread progress tracking apparatus may also periodically copy the DPI value to the DPI memory 670.

However, when the DPC value is continuously copied to the DPI memory 670, a runtime performance may be deteriorated. Accordingly, the DPC may indicate a DPI of a thread that is being executed. At a point in time when context switch is performed from a thread being currently executed to another thread, a DPC value may be copied to the DPI memory. When the other thread is dispatched and thereby is shifted to the running state, the thread progress tracking apparatus may set, to the DPC, a DPI value that is stored in a DPI memory 670 of the other thread, and may enable the DPC to make a count from a DPI value that is a previous execution index value.

When the context switch is performed to a thread before the context switch, the thread progress tracking apparatus may load a DPI value that is stored in a DPI memory of a previous thread, and set the loaded DPI value as an initial value of the DPC.

The DPC may make a count based on a system clock 650, and an operation of the DPC 630 may be controlled based on an SWND signal or an HWND signal. Accordingly, the DPC 630 may increase a count only in deterministic execution.

Figure 7:
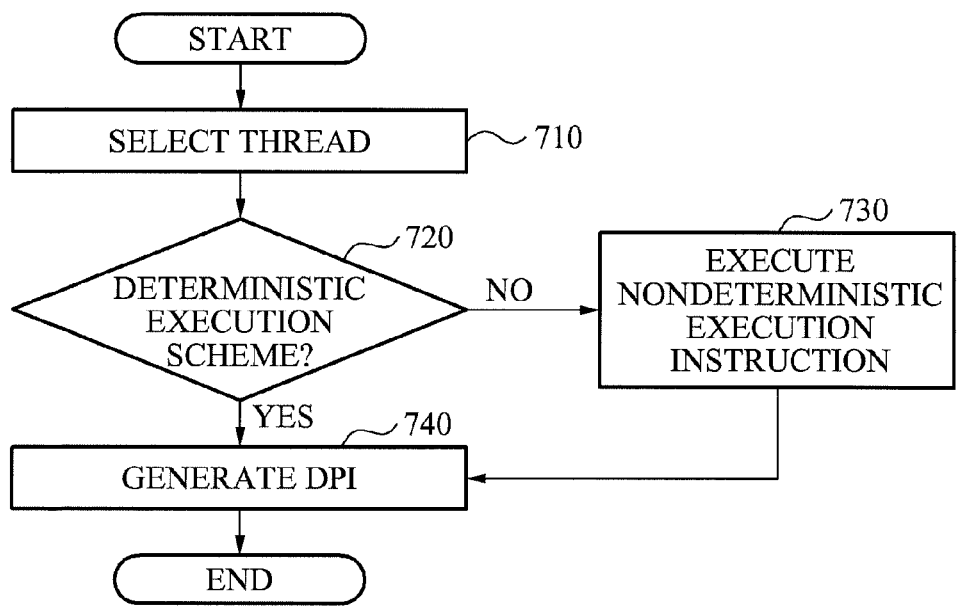
FIG. 7 illustrates a thread progress tracking method according to example embodiments.

FIG. 7 illustrates a thread progress tracking method according to example embodiments.

In operation 710, a thread progress tracking apparatus may select at least one thread constituting an application program. The thread progress tracking apparatus may select a thread that may perform a function requested by a user. A selection of the thread may be required to measure a progress state of the thread.

In operation 720, the thread progress tracking apparatus may determine whether an instruction execution scheme corresponds to a deterministic execution scheme having a regular cycle or a nondeterministic execution scheme having an irregular delay cycle with respect to each of instructions constituting a corresponding thread.

When the instruction execution scheme is determined as the nondeterministic execution scheme, the thread progress tracking apparatus may execute a nondeterministic instruction without operating a DPC in operation 730.

In the case of an instruction executed using the deterministic execution scheme among the at least one instruction, the thread progress tracking apparatus may generate a DPI based on the DPC in operation 740. An operation of the DPC may be controlled based on an HWND signal to execute an instruction using the nondeterministic execution scheme at an instruction level of a hardware based processor, or an SWND signal to execute a function using the nondeterministic execution scheme at a function level. The function may include software based instructions.

When an execution scheme of an instruction constituting a thread is deterministic after the DPI is generated, the thread progress tracking apparatus may continuously generate the DPI.

According to example embodiments, a thread progress tracking apparatus may store, in a memory, a DPI corresponding to each of the at least one thread for each thread, and copy a current DPI value to the memory when a corresponding thread is in a running state. The thread progress tracking apparatus may generate the DPI value by storing the DPC value in a DPI memory when the thread is in the running state.

The thread progress tracking apparatus may copy, to the memory as the DPI, a DPC value at a point in time when the corresponding thread is context switched to another thread. The thread progress tracking apparatus may load the copied DPI to the DPC when a context switch is performed from the other thread to a previous thread before the context switch.

Figure 8:
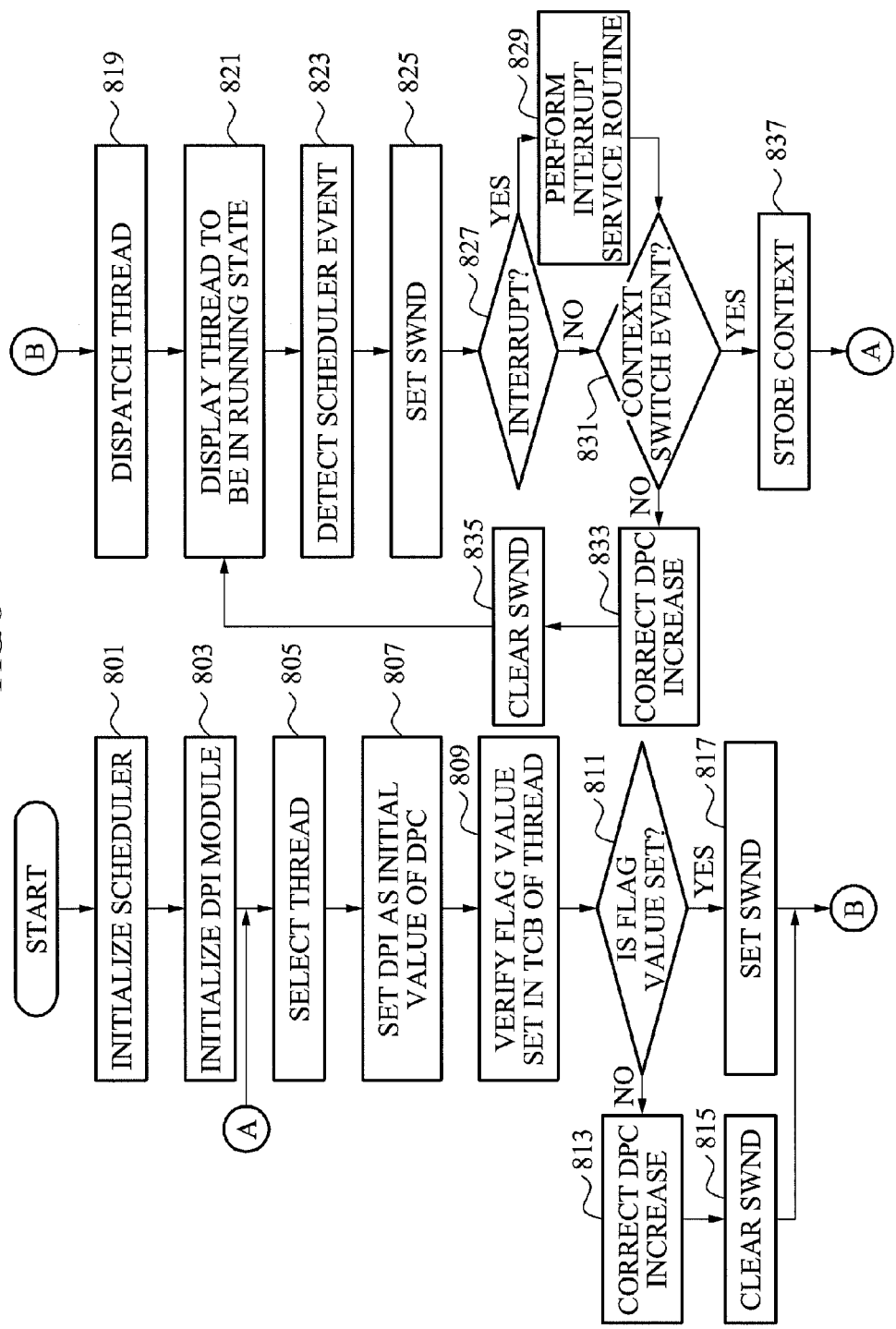
FIG. 8 illustrates a process of executing a nondeterministic (ND) function in a scheduler operation of an operation system according to example embodiments.

FIG. 8 illustrates a process of executing an ND function in a scheduler operation of an OS according to example embodiments.

An SWND signal may occur even when the ND function is executed in a running state of a thread. For example, when a dynamic memory assignment system function such as "malloc" is called in a thread, an execution time of "malloc" is inconsistent. Accordingly, a thread progress tracking apparatus may need to enable the DPC to not operate in a corresponding section by classifying an SWND execution section until a result is received from a point in time when a function "malloc" is called. The function such as "malloc" having an irregular execution time is referred to as the ND function.

In operations 801 and 803, the thread progress tracking apparatus may initialize a scheduler and a DPI module by the OS. The initialization process may be performed to distinguish a newly executed procedure from an existing performed procedure.

In operation 805, the thread progress tracking apparatus may select a thread based on an instruction to be executed on a scheduler. Since a different instruction is to be executed for each thread, a thread may be selected based on an execution instruction determined in the scheduler.

In operation 807, the thread progress tracking apparatus may set a DPI stored in the thread as an initial value of the DPC. The DPC value may start from "0". However, when context switch is performed from another thread to an original thread, the thread progress tracking apparatus may start a count by setting the DPI stored in the DPI memory as the initial value of the DPC.

In operations 809 and 811, the thread progress tracking apparatus may determine whether a flag value is set in a thread control block of the thread. The flag value may indicate that the ND function is being executed. The thread progress tracking apparatus may use a flag of the thread control block in order to indicate that the ND function is executed in a running state of the thread. That is, a code may be added to a general scheduler algorithm so that a counter of the DPC may not increase in an SWND section.

In operation 813, when the flag value is not set, the thread progress tracking apparatus may correct an increase of the DPC that is unused to execute an instruction of an actual thread. In operation 815, the thread progress tracking apparatus may clear an SWND signal to operate the suspended DPC.

For each section, a DPC cycle to be corrected may need to be defined and the DPC may be corrected based on the defined DPC cycle. The DPC cycle may include a cycle used for a formal operation, for example, a set, a clear, and an inactivation. For example, when an execution time used to set the SWND signal is four cycles, a corresponding cycle does not correspond to a cycle used to execute an instruction in the thread. Accordingly, a correction may be performed by subtracting four cycles from the DPC value before clearing the SWND signal. Similarly, when the ND function is called, the DPC value may need to be corrected.

In operation 817, when the flag value is set in the thread control block, the thread progress tracking apparatus may set the SWND signal to suspend the DPC.

In operations 819 and 821, the thread progress tracking apparatus may dispatch the thread to be in the running state. Since the DPC operates after the SWND signal is cleared, an instruction requested by the thread may be continuously performed through B.

In operations 823 and 825, when a scheduler event occurs in the thread that is in the running state, the thread progress tracking apparatus may set the SWND signal to suspend the DPC. The scheduler event may include, for example, an interrupt, an input/output wait, and an ND function.

In operations 827 and 829, when the interrupt occurs, the thread progress tracking apparatus may perform an interrupt service routine, and may set the SWND signal to suspend a counting operation of the DPC. Operations 827 and 829 may be included as examples of the scheduler event of operations 823 and 825.

In operation 831, the thread progress tracking apparatus may determine whether a context switch event occurs in a state where the DPC is suspended.

In operation 837, when the context switch event occurs, the thread progress tracking apparatus may store a value of the suspended DPC as a DPI value of the thread before the context switch. The thread progress tracking apparatus may store a context result performed until the context switch occurs.

In operation 833, when the scheduler event is terminated in a state where the DPC is suspended, the thread progress tracking apparatus may correct an increase of the DPC that is unused to execute an instruction of an actual thread. In operation 835, the thread progress tracking apparatus may clear the SWND signal to operate the suspended DPC.

Also, the thread progress tracking apparatus may repeat the above procedure by selecting a thread prepared after the context switch through A.

Figure 9:
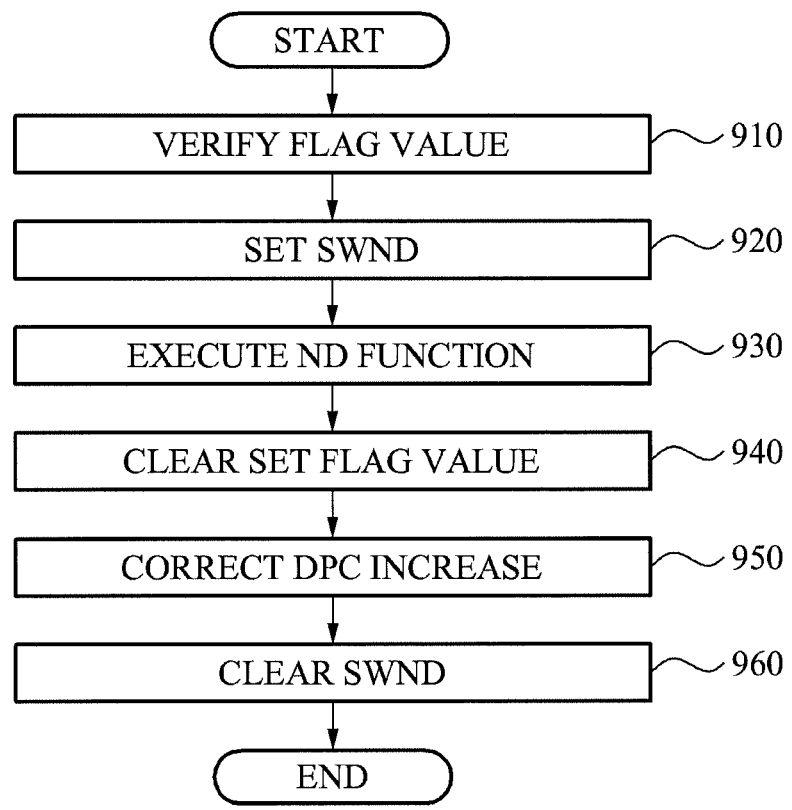
FIG. 9 illustrates an operation of a DPC when an ND function operates in a running state of a thread according to example embodiments.

FIG. 9 illustrates an operation of a DPC when an ND function operates in a running state of a thread according to example embodiments. FIG. 9 illustrates an operation of a DPC when a user function is used as the ND function while executing a general application program.

In operation 910, a thread progress tracking apparatus may determine whether a flag value is set in a thread control block of a thread. The flag value may indicate that the user function is being executed as the ND function. Examples of generating an SWND signal may include an example of generating an SWND signal by providing a separate API as the user function. For example, a particular function may be repeatedly performed by "busy waiting". In the case of a function of adding data by verifying whether an input queue of an external device is empty, a delay time used for verification may be nondeterministic depending on a state of the external device. Accordingly, in this case, the thread progress tracking apparatus may enable the DPC to not operate in a nondeterministic execution section by providing the separate API. As another example, a pseudo code may show a scheme of processing a user busy waiting function. The nondeterministic execution section may be set by providing "DetermSWNDSet( )", "DetermSWNDClear( )" API, and the like.

```
NonDetermBusyWait(void (*function)(void*), void *Args) {
    SetNDFunctionFlag( );
    SetDPCDisable( );
    function(Args); /* process  nondeterministic  user  function
    ClearNDFunctionFlag( );
    ClearDPCEnable( );
}
DetermSWNDSet(void) {
    SetNDFunctionFlag( );
    SetDPCDisable( );
}
DetermSWNDClear(void) {
    ClearNDFunctionFlag( );
    ClearDPCEnable( );
}
```

In operation 920, when the flat value is set, the thread progress tracking apparatus may set the SWND signal to suspend the DPC.

In operation 930, the thread progress tracking apparatus may execute the user function as the ND function.

In operation 940, when the execution is completed, the thread progress tracking apparatus may clear the set flag value.

In operation 950, the thread progress tracking apparatus may correct the increase of the DPC that is unused to execute an instruction of an actual thread. Next, in operation 960, the thread progress tracking apparatus may clear the SWND signal to operate the suspended DPC only in a predetermined deterministic execution section.

Figure 10:
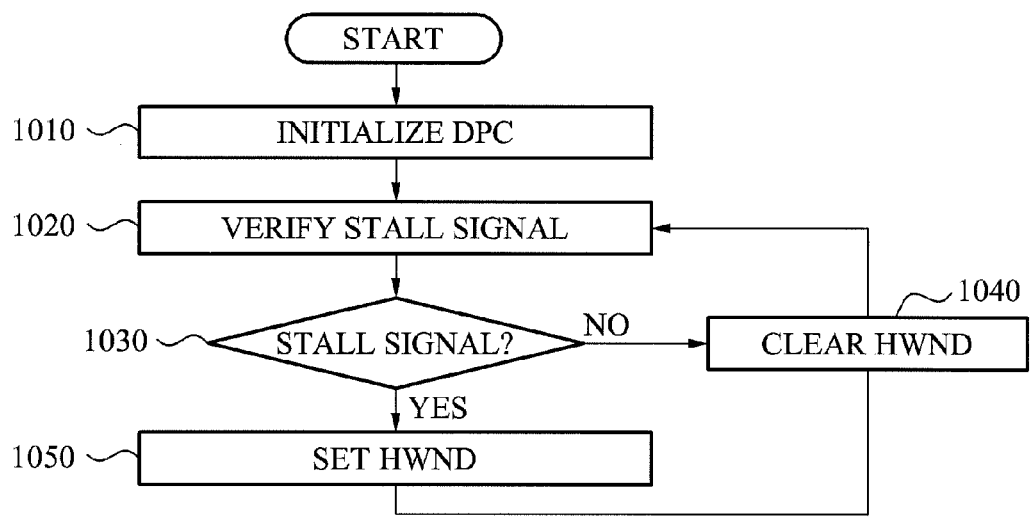
FIG. 10 illustrates a process of generating a hardware nondeterministic execution (HWND) signal according to example embodiments.

FIG. 10 illustrates a process of generating an HWND signal according to example embodiments.

In operation 1010, a thread progress tracking apparatus may initialize a DPC. Here, initialization indicates that an instruction execution procedure to be started is shut off from an existing instruction execution procedure.

In operation 1020, the thread progress tracking apparatus may verify a stall signal of a processor. When a signal or a state of the processor indicating a nondeterministic execution section of the processor exists in addition to the stall signal, the thread progress tracking apparatus may not increase a count of the DPC in the nondeterministic execution section by employing the signal or the state of the processor as a signal for controlling the DPC.

In operation 1030, the thread progress tracking apparatus may determine whether the stall signal is detected. In operation 1050, when the stall signal is detected, the thread progress tracking apparatus may set an HWND signal to suspend an operation of the DPC.

Conversely, when the stall signal is not detected, the thread progress tracking apparatus may clear the HWND signal in operation 1040. Accordingly, when an operation of the DPC is suspended, the DPC may re-operate. When the DPC is not suspended, the DPC may continuously operate.

A bit-width of the DPC may be determined based on the cycle of the processor. When the bit-width of the DPC is significantly narrow, overflow may frequently occur. Accordingly, an update period may need to be significantly reduced. Accordingly, when the bit-width of the DPC is greater than or equal to 64 bits, counter overflow may not occur. Accordingly, it is possible to minimize a performance deterioration coming from a counter update. When an operational clock of a system is less than or equal to 50 MHz, it is possible to minimize a configuration cost by decreasing the bit-width to be in proportion to the operational clock.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for thread progress tracking, comprising:
a processor, comprising:
a selector to select at least one thread constituting an application program;
a determination unit to determine, by at least a processor, based on a predetermined criterion, whether an instruction execution scheme corresponds to one of a deterministic execution scheme having a regular cycle and a nondeterministic execution scheme having an irregular delay cycle with respect to each of at least one instruction constituting a corresponding thread where an irregular delay cycle occurs when additional code is inserted in a nondeterministic execution scheme; and
a deterministic progress counter to generate a deterministic progress index with respect to an instruction that is executed by the deterministic execution scheme, excluding generating the deterministic progress index for an instruction that is executed by the nondeterministic execution scheme having the irregular delay.

2. An apparatus for thread progress tracking, comprising:
a processor comprising:
a selector to select at least one thread constituting an application program;
a determination unit to determine, by at least a processor, based on a predetermined criterion, whether an instruction execution scheme corresponds to a deterministic execution scheme having a regular cycle or a nondeterministic execution scheme having an irregular delay cycle with respect to each of at least one instruction constituting a corresponding thread; and
a deterministic progress counter to generate a deterministic progress index with respect to an instruction that is executed by the deterministic execution scheme, excluding an instruction that is executed by the nondeterministic execution scheme,
wherein the nondeterministic execution scheme comprises a hardware nondeterministic execution (HWND) to execute the instruction using the nondeterministic execution scheme at an instruction level of a hardware based processor, and a software nondeterministic execution (SWND) to execute a function using the nondeterministic execution scheme at a function level, the function including software based instructions.

3. The apparatus of claim 2, wherein when the instruction execution scheme is determined as the deterministic execution scheme, the deterministic progress counter increases the deterministic progress index based on a system clock.

4. The apparatus of claim 2, wherein an operation of the deterministic progress counter is controlled based on an HWND signal to execute the instruction using the nondeterministic execution scheme at an instruction level of a hardware based processor, or an SWND signal to execute a function using the nondeterministic execution scheme at a function level, the function including software based instructions.

5. The apparatus of claim 4, wherein the HWND signal is generated based on a stall signal occurring at a processor.

6. The apparatus of claim 4, wherein when a user function is executed, the SWND signal is generated using a separate code.

7. The apparatus of claim 2, wherein the deterministic progress counter comprises a control unit to control an SWND signal executing a function using the nondeterministic execution scheme at a function level, so that the deterministic progress counter does not operate when the corresponding thread is not in a running state, and the function includes software based instructions.

8. The apparatus of claim 7, wherein:
when an interrupt occurs in the running state of the thread, the control unit sets the SWND signal to suspend the deterministic progress counter, and
when the thread becomes in the running state after an interrupt service routine is performed, the control unit clears the SWND signal to operate the deterministic progress counter.

9. The apparatus of claim 2, wherein the deterministic progress counter is positioned based on a processor unit.

10. The apparatus of claim 2, further comprising:
a memory to store a deterministic progress index corresponding to each of the at least one thread for each thread; and
a copy unit to copy a current deterministic progress counter value to the memory when the corresponding thread is in a running state.

11. The apparatus of claim 10, wherein:
the copy unit copies, to the memory as the deterministic progress index, a deterministic progress counter value at a point in time when the corresponding thread is context switched to another thread, and
the apparatus further comprises:
a loading unit to load the copied deterministic progress index to the deterministic progress counter when a context switch is performed from the other thread to a previous thread before the context switch.

12. The apparatus of claim 2, wherein the determination unit comprises a set determination unit to determine whether a flag value is set in a thread control block of the corresponding thread on a scheduler, the flag value indicating that the nondeterministic function is being executed.

13. The apparatus of claim 12, wherein
the set determination unit sets an SWND signal to suspend the deterministic progress counter when the flag value is set, and
the set determination unit corrects an increase of the deterministic progress counter that is unused to execute an instruction of an actual thread when the flag value is not set.

14. A method for thread progress tracking, comprising:
selecting at least one thread constituting an application program;
determining, based on a predetermined criterion, whether an instruction execution scheme corresponds to one of a deterministic execution scheme having a regular cycle and a nondeterministic execution scheme having an irregular delay cycle with respect to at each of least one instruction constituting the corresponding thread where an irregular delay cycle occurs when additional code is inserted in a nondeterministic execution scheme; and
generating a deterministic progress index based on a deterministic progress counter, with respect to an instruction that is executed by the deterministic execution scheme, excluding generating the deterministic progress index for an instruction that is executed by the nondeterministic execution scheme having the irregular delay.

15. A method for thread progress tracking, comprising:
selecting at least one thread constituting an application program;

determining, based on a predetermined criterion, whether an instruction execution scheme corresponds to a deterministic execution scheme having a regular cycle or a nondeterministic execution scheme having an irregular delay cycle with respect to at each of least one instruction constituting the corresponding thread; and generating a deterministic progress index based on a deterministic progress counter, with respect to an instruction that is executed by the deterministic execution scheme, excluding an instruction that is executed by the nondeterministic execution scheme, wherein an operation of the deterministic progress counter is controlled based on a hardware nondeterministic execution (HWND) signal to execute the instruction using the nondeterministic execution scheme at an instruction level of a hardware based processor, or a software nondeterministic execution (SWND) signal to execute a function using the nondeterministic execution scheme at a function level, the function including software based instructions.

16. The method of claim 15, further comprising:

storing, in a memory, a deterministic progress index corresponding to each of the at least one thread for each thread; and copying a current deterministic progress counter value to the memory when the corresponding thread is in a running state.

17. The method of claim 16, wherein:

the copying comprises copying, to the memory as the deterministic progress index, a deterministic progress counter value at a point in time when the corresponding thread is context switched to another thread, and the method further comprises:

loading the copied deterministic progress index to the deterministic progress counter when a context switch is performed from the other thread to a previous thread before the context switch.

18. The method of claim 15, wherein:

the determining comprises determining whether a flag value is set in a thread control block of the thread, the flag set indicating that the nondeterministic function is being executed, and the method further comprises:

setting the SWND signal to suspend the deterministic progress counter when the flag value is set;

executing a nondeterministic function; and clearing the set flag value when the execution of the nondeterministic function is completed, and correcting an increase of the deterministic progress counter that is unused to execute an instruction of an actual thread and then clearing the SWND signal to operate the suspended deterministic progress counter.

* * * * *